US011775216B2

(12) United States Patent
Zhu et al.

(10) Patent No.: US 11,775,216 B2
(45) Date of Patent: Oct. 3, 2023

(54) MEDIA ACCESS OPERATION COMMAND MANAGEMENT USING MEDIA BUFFERS

(71) Applicant: Micron Technology, Inc., Boise, ID (US)

(72) Inventors: Fangfang Zhu, San Jose, CA (US); Jiangli Zhu, San Jose, CA (US); Juane Li, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 24 days.

(21) Appl. No.: 17/460,828

(22) Filed: Aug. 30, 2021

(65) Prior Publication Data
US 2023/0064282 A1 Mar. 2, 2023

(51) Int. Cl.
*G06F 3/06* (2006.01)
(52) U.S. Cl.
CPC ............ *G06F 3/0659* (2013.01); *G06F 3/064* (2013.01); *G06F 3/0604* (2013.01); *G06F 3/0679* (2013.01)
(58) Field of Classification Search
CPC ...... G06F 3/0659; G06F 3/0604; G06F 3/064; G06F 3/0679
See application file for complete search history.

(56) References Cited

U.S. PATENT DOCUMENTS

| | | | |
|---|---|---|---|
| 4,843,542 A | 6/1989 | Dashiell | |
| 5,432,918 A * | 7/1995 | Stamm | G06F 9/3857 711/E12.024 |
| 5,745,732 A * | 4/1998 | Cherukuri | G06F 12/0835 711/149 |
| 5,774,643 A | 6/1998 | Lubbers | |
| 6,728,792 B2 | 4/2004 | Wagner | |
| 9,864,546 B1 | 1/2018 | Kovishaner | |
| 2005/0044317 A1* | 2/2005 | Rivers | G06F 12/0897 711/E12.043 |
| 2006/0136659 A1* | 6/2006 | Jain | G11C 15/00 711/155 |
| 2007/0198785 A1* | 8/2007 | Kogge | G06F 9/5044 712/14 |
| 2009/0327614 A1* | 12/2009 | Shinkar | G06F 12/0875 711/E12.001 |

(Continued)

OTHER PUBLICATIONS

USPTO, Office Action for U.S. Appl. No. 17/460,972, dated Sep. 23, 2022.

(Continued)

*Primary Examiner* — Francisco A Grullon
(74) *Attorney, Agent, or Firm* — Lowenstein Sandler LLP

(57) ABSTRACT

A system includes a memory device, and a processing device, operatively coupled with the memory device, to perform operations including receiving a media access operation access command to perform a media access operation with respect to a memory location residing on the memory device, determining whether there exists another memory location access at the memory location, in response to determining that another memory location access exists at the memory location, determining whether the media access operation command is a read command, and in response to determining that the media access operation is a read command, servicing the media access operation command from a media buffer. The media buffer maintains data associated with the completed write operation.

20 Claims, 7 Drawing Sheets

(56) References Cited

U.S. PATENT DOCUMENTS

| | | | |
|---|---|---|---|
| 2013/0318283 A1* | 11/2013 | Small | G06F 12/0802 |
| | | | 711/E12.008 |
| 2014/0089592 A1* | 3/2014 | Biswas | G06F 1/3275 |
| | | | 711/E12.07 |
| 2017/0123921 A1 | 5/2017 | Ptak | |
| 2019/0121577 A1* | 4/2019 | Mazumder | G11C 29/023 |
| 2019/0317693 A1* | 10/2019 | La Fratta | G06F 3/0611 |
| 2020/0379684 A1* | 12/2020 | Subbarao | G06F 3/0659 |
| 2022/0197563 A1* | 6/2022 | Lam | G06F 3/0679 |

OTHER PUBLICATIONS

USPTO, Notice of Allowance for U.S. Appl. No. 17/460,972, dated Mar. 3, 2023.

* cited by examiner

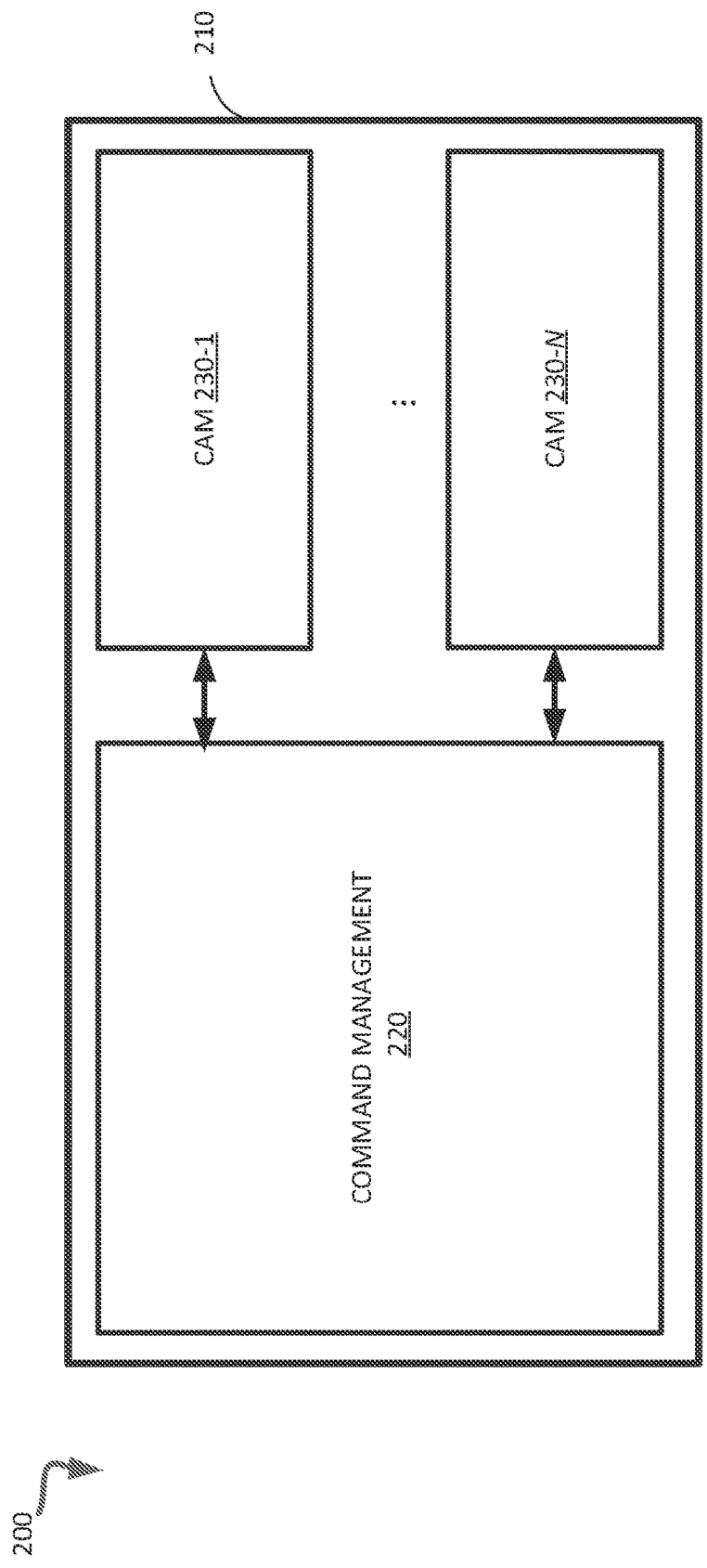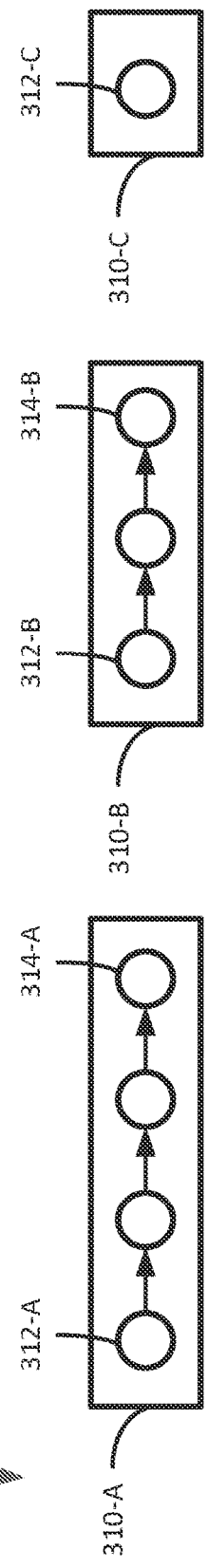

US 11,775,216 B2

MEDIA ACCESS OPERATION COMMAND MANAGEMENT USING MEDIA BUFFERS

TECHNICAL FIELD

Embodiments of the disclosure relate generally to memory sub-systems, and more specifically, relate to media access operation command management using media buffers.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a block diagram of example system including a media access operation command management (MOCM) component, in accordance with some embodiments of the present disclosure.

FIG. 3 is a diagram illustrating examples of queues of media access operation commands in accordance with some embodiments of the present disclosure.

DETAILED DESCRIPTION

Figure 1:
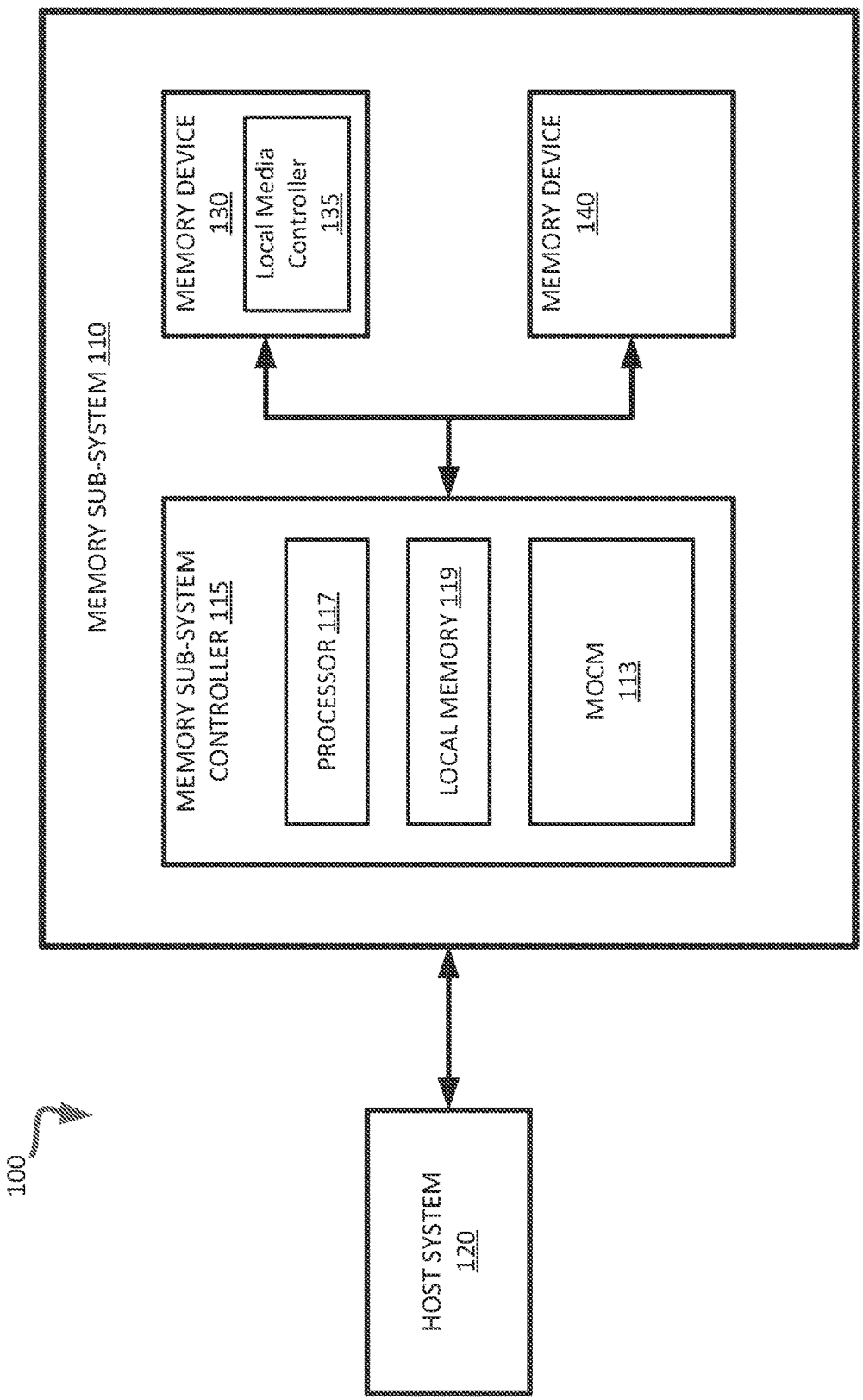
FIG. 1 illustrates an example computing system that includes a memory sub-system, in accordance with some embodiments of the present disclosure.

Aspects of the present disclosure are directed to automatic chip initialization retry. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. A non-volatile memory device is a package of one or more dies. Each die can consist of one or more planes. For some types of non-volatile memory devices, each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A non-volatile memory device can implement a cross point memory architecture. One example of cross point memory architecture is three-dimensional cross point (3DXP) memory architecture. A 3DXP memory architecture can be byte-addressable (e.g., similar to dynamic random-access memory (DRAM)). A 3DXP memory array can include a stackable cross point architecture in which the cells are located at the intersections of row address lines (wordlines or WLs) and column address lines (bitlines or BLs) arranged in a grid. More specifically, WLs and BLs cross in the formation of the grid, and each 3DXP memory cell ("3DXP cell") can be coupled between a WL and a BL at a cross point. At the cross point, the WL and BL can be positioned at different vertical planes such that the WL crosses over the BL without physical contact. The 3DXP architecture is stackable to improve storage density, such that a WL can cross over a first BL located beneath the WL and a second BL located above the WL.

A 3DXP cell can have a high-resistance state or a low-resistance state, and changing the resistance level of the 3DXP cell changes whether the 3DXP cell is read as a 1 or a 0. Since the 3DXP cells are persistent memory cells, they can hold their values indefinitely (e.g., in the event of a power loss). Read and write operations can occur by varying the amount of voltage sent to each selector. For write operations, a first voltage can be applied to activate the selector and enable voltage through to the cell to initiate a bulk property change. For read operations, a second voltage (which can be different from the first voltage) can be applied to determine whether the 3DXP cell is in a high-resistance state or a low-resistance state. Data can be written to the 3DXP cell at a bit-level, which can be provide advantages over other non-volatile memory technology (e.g., NAND flash, in which all the bits of a block are erased before writing data to the block). Accordingly, 3DXP devices can have a better latency than, e.g., NAND flash devices, while costing less than e.g., DRAM devices.

In some implementations, a 3DXP cell can be a phase-change memory (PCM) cell. A PCM cell can store data by changing the state of a phase-change material. For example, when heated, the phase-change material can transition between two states or phases (e.g., crystalline and amorphous). One example of a phase-change material is a chalcogenide glass. PCM can enable the ability to achieve a number of distinct intermediary states, thereby having the ability to hold multiple bits in a single cell. PCM can enable a class of non-volatile memory referred to as non-volatile random-access memory (NVRAM).

Media access operations can generally be classified into respective categories, such as read operations, write operations, erase operations, etc. A memory sub-system controller can assign media access operation commands to a queue. Illustratively, the queue can be in the form of a linked list including a head and a tail, where media access operation commands are executed in a first-in, first-out (FIFO) manner. Since a media access operation command from only one of the queues may be executed at a time, the memory sub-system controller can use a sequencer to service commands identified within the queues according to a scheduling scheme.

However, certain memory devices (e.g., 3DXP memory devices) can have a characteristic in which reading data from a memory location (e.g., physical block address (PBA)) within a window of time (e.g., within 1 millisecond (ms)) after the data has been written to the memory location can cause a large number of data errors in the data. The number of errors can be beyond the error correction capability of error correcting code (ECC) and can cause a read failure. To address this, such memory devices can implement a delay period after a write operation is completed before servicing a host read command with respect to the same memory location (e.g., a physical block address (PBA)). The purpose of the delay period is to ensure that data written to the memory location is correct programmed and to avoid data corruption, and thus meet performance and/or Quality of Service (QoS) requirements. Although the delay period may be needed to reduce data errors, the delay can negatively contribute to host read command latency by increasing the time it takes to retrieve data from the location and return the data back to the host system. This can be problematic as there can be strict host read command latency requirements with respect to certain memory device implementations (e.g., 3DXP memory device implementations).

Aspects of the present disclosure address the above and other deficiencies by having a memory sub-system that can implement media access operation command management using media buffers. A media access operation command can be used to request a media access operation (e.g., read, write), and can designate a memory location residing on a memory device (e.g., a logical address corresponding to a physical address on the memory device) that is being accessed by the media access operation command. In some embodiments, the memory location corresponds to a physical block address (PBA) designating a physical block of a memory device. A media controller ("controller") can include a media access management component and a set of CAMs.

The media access management component can handle command execution order based on time of entry or receipt (e.g., a FIFO command execution scheme). Each CAM can maintain a queue (e.g., linked list) identifying a set of media access operation commands in the temporal order of receiving the media access operation commands (e.g., for a FIFO command execution scheme, appending a new media access operation command to the tail of the queue). Each of the queues identifies media access operation commands with respect to a particular respective memory location (e.g., PBA). Functions performed by the controller can include a search operation, an insertion operation and a deletion operation. During the search operation, a search is performed to determine whether there exists a memory operation command with respect to the same physical address as the physical address specified by an incoming media access operation command. During the insertion operation, a decision is made whether to insert the incoming media access operation command into the queue based on the search result. Further, it can be determined whether the new media access operation command should be executed immediately, or should be blocked. During the deletion operation, the command corresponding to a completed media access operation can be deleted from the queue (e.g., from the head of the queue) and the next media access operation command (if one exists) can replace the completed media access operation command at the head of the queue.

After completion of a media access operation, the controller can implement a delay period (e.g., by using a delay line) with respect to the deletion operation to postpone removal of the corresponding completed media access operation command from the queue. Any media access operation command attempting to access to the same address (e.g., PBA) designated by the completed write operation command is postponed in accordance with the delay period. To address the negative impact of the delay period on host command read latency, the controller can utilize a media buffer to maintain previously written data corresponding to a previously completed write operation. As new data is received by the media buffer (e.g., responsive to new write operation commands), older data at the media buffer can be overwritten by the new data. For an incoming read command designating a memory location residing on a memory device, the controller can determine whether to service the incoming read command from the memory location of the memory device, or from the media buffer, by utilizing the queue corresponding to the memory location. For example, if there is a read hit at a queue corresponding to the memory location with respect to a write or read operation indicated by the queue, then the controller can read the data requested by the read command from the media buffer. Otherwise, if there is a read miss at the queue with respect to the incoming read command, then the controller can bypass the media buffer and read the data requested by the read command from the memory location residing on the memory device.

Advantages of the present disclosure include, but are not limited to, improved host read command latency and quality of service (QoS), improved data transaction synchronization, and reduced hardware implementation complexity.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point (3DXP), can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRA1V1), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media access operation command management (MOCM) component 113. In some embodiments, the memory sub-system controller 115 includes at least a portion of the MOCM component 113. In some embodiments, the MOCM component 113 is part of the host system 110, an application, or an operating system. In other embodiments, local media controller 135 includes at least a portion of MOCM component 113 and is configured to perform the functionality described herein.

The MOCM component 113 can implement media access operation command management. For example, the MOCM component 113 can ensure data consistency by guaranteeing that only one media access is released for a same memory location residing on a memory device (e.g., physical block address (PBA)). To do so, the MOCM component 113 can maintain a queue identifying a set of media access operation commands in temporal order based on a time of entry (e.g., FIFO), where the queue corresponds to a memory location, and manage incoming media access operation commands by performing a set of operations based on the media access operation command entries within the queue. For example, the set of operations can include at least one of a search operation to determine whether an incoming media access operation command is attempting to access the same memory location designated by a previous media access operation command in the queue, an insertion operation to determine whether or not to insert the incoming media access operation command into the queue based on the search operation, and a deletion operation to delete completed media access operation commands from the queue and forward a next media access operation command in the queue for execution.

The MOCM component 113 can impose a delay period after a previous write operation has been completed. For example, the delay period can postpone the deletion of the completed write command from a queue. To improve read latency, if an incoming read command designates a memory location that is the same as an existing media operation access at the memory location (e.g., a read hit in the queue), the MOCM component 113 can service the read command from the media buffer. This can reduce the negative impact on host command read latency resulting from the delay period. Otherwise, if a media operation access does not exist the same memory location (e.g., a read miss at the queue), the MOCM component 113 can bypass the media buffer by servicing the read command from the memory device. Further details regarding the operations of the MOCM component 113 are described below.

FIG. 2 is a block diagram of example system 200 including a media access operation command management (MOCM) component 210, in accordance with some embodiments of the present disclosure. The MOCM component 210 can be included within a memory sub-system controller. For example, the MOCM component 210 can be the same as the MOCM component 113 of the memory sub-system controller 115 of FIG. 1. The MOCM component 210 can be included in any suitable memory sub-system in accordance with the embodiments described herein. For example, the MOCM component 210 can be included within a memory sub-system corresponding to a 3DXP memory device (e.g., the memory device 130 of FIG. 1).

As shown, the MOCM component 210 can include a command management component 220 (e.g., stripe command management component) and a number of CAMs 230-1 through 230-N. The command management component 220 can handle data integrity and command order based on time of entry (e.g., a FIFO command execution scheme). Each of the CAMs 230-1 through 230-N can maintain a queue of media access operation commands that have been requested, where each queue includes media access operation commands designating a memory location residing on the memory device (e.g., a particular physical block address (PBA)). In some embodiments, each queue of media access operation commands includes a linked list of temporally ordered media access operation commands based on time of entry. Examples of linked lists of media access operation are described below with reference to FIG. 3. Each of the CAMs 230-1 through 230-N can manage incoming media access operation commands to address the negative impact on host command read latency resulting from a delay period imposed after a write operation is completed. As will be described in further detail below with reference to FIG. 4, an incoming media access operation command can be managed in view of the delay period based on the memory and type of media access operation (e.g., read operation or write operation) designated by the incoming media access operation command.

FIG. 3 is a diagram 300 illustrating examples of queues of media access operation commands, in accordance with some embodiments of the present disclosure. The diagram 300 shows a first queue 310-A corresponding to a first memory location residing on a memory device (e.g., PBA), a second queue 310-B corresponding to a second memory location residing on the memory device, and a third queue 310-C corresponding to a third memory location residing on the memory device. The first queue 310-A includes four media access operation commands, including a head media access operation command 312-A and a tail media access operation command 314-A. The second queue 310-B includes three media access operation commands, including a head media access operation command 312-B and a tail media access operation command 312-B. The third queue 310-C includes a media access operation command 312-C, which can be both a head media access operation command and a tail media access operation command.

In some embodiments, each of the queues 310-A through 310-C is in the form of a linked list. An incoming media access operation command can be appended to the tail of the linked list (e.g., FIFO order). For example, the head media access operation commands 312-A through 312-C can correspond to the oldest media access operation commands remaining in their respective queues 310-A through 310-C, and the tail media access operation commands 314-A through 314-C can correspond to the oldest media access operation commands remaining in their respective queues 310-A through 310-C. After one of the head media access operation commands 312-A through 312-C is completed, the head media access operation command is deleted from its corresponding queue, and any next media access operation command linked to the head media access operation command becomes the new head media access operation command (if one exists). If a next media access operation command linked to the head media access operation command does not exist, such as that shown in queue 310-C with respect to the single media access operation command 312-C, then no additional media access operation commands are performed with respect to the corresponding memory location until a new media access operation command at the memory location.

Figure 4:
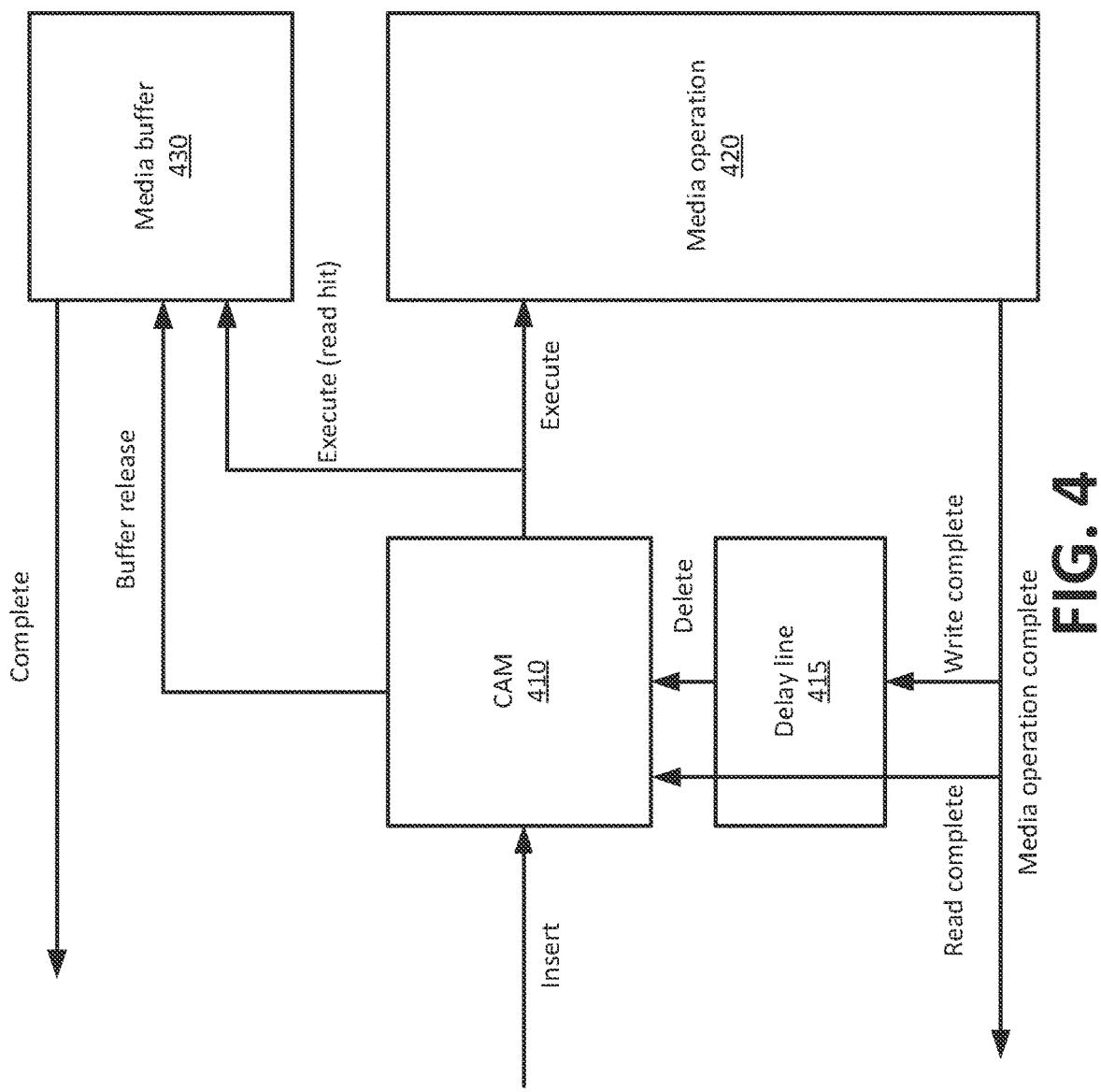
FIG. 4 is a block diagram of an example system for implementing media access operation command management using a media buffer, in accordance with some embodiments of the present disclosure.

FIG. 4 is a block diagram of an example system 400 for implementing media access operation command management using a media buffer, in accordance with some embodiments of the present disclosure. The system 400 can be implemented by a memory sub-system controller, such as the memory sub-system controller 115 of FIG. 1. As shown, the system 400 includes a content-addressable memory (CAM) 410 and a delay line 415 to implement a delay period (e.g., about 10 µs) after completion of a write operation. The CAM 410 can manage an incoming media access operation command to address the negative impact on host command read latency resulting from the delay period. The incoming media access operation command can designate a type of media access operation (e.g., read operation, write operation), and a memory location residing on the memory device to be accessed (e.g., PBA). The CAM 410 can maintain a queue corresponding to the memory location.

For example, as shown in FIG. 4, the CAM 410 can perform an insertion operation ("Insert") with respect to the incoming media access operation command. The insertion operation can be controlled based on a search operation that is performed to determine whether there exists a same memory location access in the queue ("memory location hit"). If the search operation determines that there is a memory location hit, then the insertion operation performed by the CAM 410 can depend on the type of media access operation designated by the incoming media command. For example, if the incoming media access operation command is an incoming read command, then the CAM 410 can skip insertion into the queue corresponding to the memory location, and can directly forward the incoming read command to a media buffer 430 for execution ("Execute (read hit)"). The media buffer 430 holds data from a previous write command corresponding to the memory location, which enables the incoming read command to be served. If the incoming media access operation is not an incoming read command (e.g., an incoming write command), then the CAM 410 can insert the incoming media access operation to the end or tail of the queue corresponding to the given memory location to obtain an inserted media access operation command. By doing this, the CAM 410 can block the inserted media access operation command from execution until the inserted media access operation command can be forwarded for execution (e.g., when the inserted media access operation command becomes the head of the queue).

However, if a same memory location access is not determined to exist in the queue (e.g., a memory location miss), the CAM 410 can insert the incoming media access operation into the queue to obtain an inserted media access operation. The CAM 410 can mark the inserted media access operation as the head of the queue, and forward the inserted media access operation to a media access operation component 420 for execution ("Execute"). The media access operation component 420 can generate an indication that the corresponding media access operation is completed ("Media access operation complete").

If the media access operation is a write, then a write completion indication ("Write complete") can be received by the delay line 415 to implement a delay period to have the CAM 410 delete the corresponding write command entry from the queue corresponding to the given address ("Delete"). If a blocked command exists in the queue corresponding to the given address, then a first blocked command is forwarded for execution. If the media access operation is a read, then a read completion indication ("Read complete") can be received by the CAM 410 directly. This can cause the CAM 410 to unblock the following write command from the queue corresponding to the given address.

The CAM 410 can further cause the media buffer 430 to release its currently maintained data in response to new data being written by a new write operation ("Buffer release"), and the media buffer 430 can provide an indication that the buffer release is complete ("Complete"). Further details regarding the operations of system 400 will be described below with reference to FIGS. 5-7.

Figure 5:
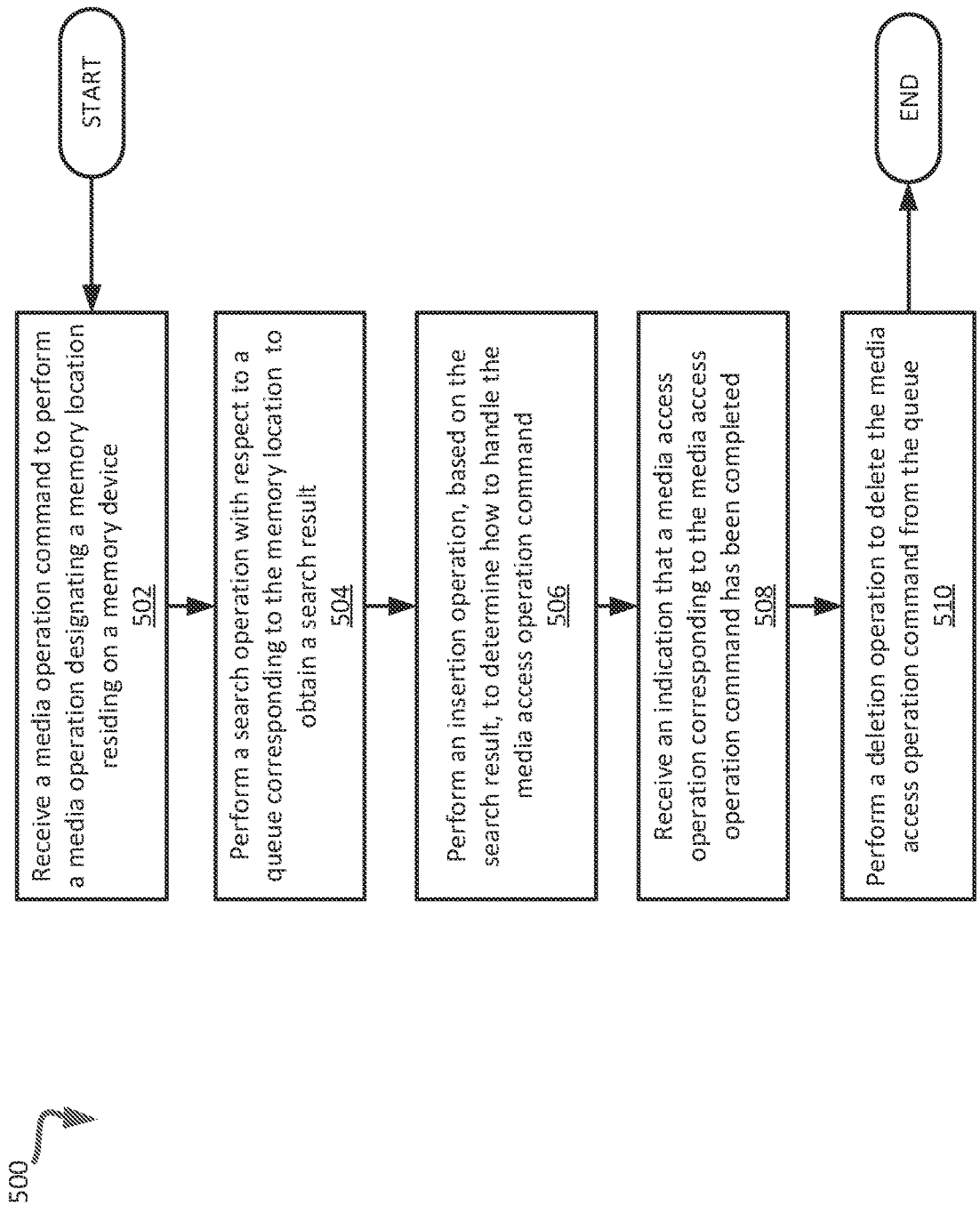
FIG. 5 is a flow diagram of an example method to implement media access operation command management using a media buffer, in accordance with some embodiments of the present disclosure.

FIG. 5 is a flow diagram of an example method 500 to implement media access operation command management using a media buffer, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the MOCM component 113 and 210 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic receives a media access operation command to perform a media access operation designating a memory location residing on a memory device. The memory location can be associated with any suitable memory device. In some embodiments, the memory location is a physical block address (PBA). For example, the PBA can be associated with a 3DXP memory device. The media access operation command can further designate a type of the media access operation to be performed. Examples of types of media access operations include a write operation and a read operation.

At operation 504, the processing logic performs a search operation with respect to a queue corresponding to the memory location to obtain a search result. The queue can be maintained by a content-addressable memory (CAM). The search result can be indicative of whether there is a memory location hit (e.g., a same memory location access exists) or a memory location miss (a same memory location access does not exist). At operation 506, the processing logic performs an insertion operation, based on the search result, to determine how to handle the media access operation command. The processing logic can perform the insertion operation based on whether there is a memory location hit and, if there is a memory location hit, whether the media access operation command is a read command. For example, if an incoming media access operation command is a read command and there is a memory location hit (a read hit), the controller can service the read command directly from the media buffer. Otherwise, the media access operation command can be inserted into the queue. Further details regarding operations 504-506 will be described below with reference to FIG. 6.

At operation 508, the processing logic can receive an indication that the media access operation has been completed and, at operation 510, the processing logic, in response to receiving the indication that the media access operation has been completed, performs a deletion operation to delete the command from the queue. The indication can be received from the memory device (e.g., NAND) or the media buffer. Performing the deletion operation can further include determining whether a blocked media access operation command exists in the queue corresponding to the memory location and, if so, forwarding the first blocked media access operation command for execution. Further details regarding the deletion operation will be described below with reference to FIG. 7.

Figure 6:
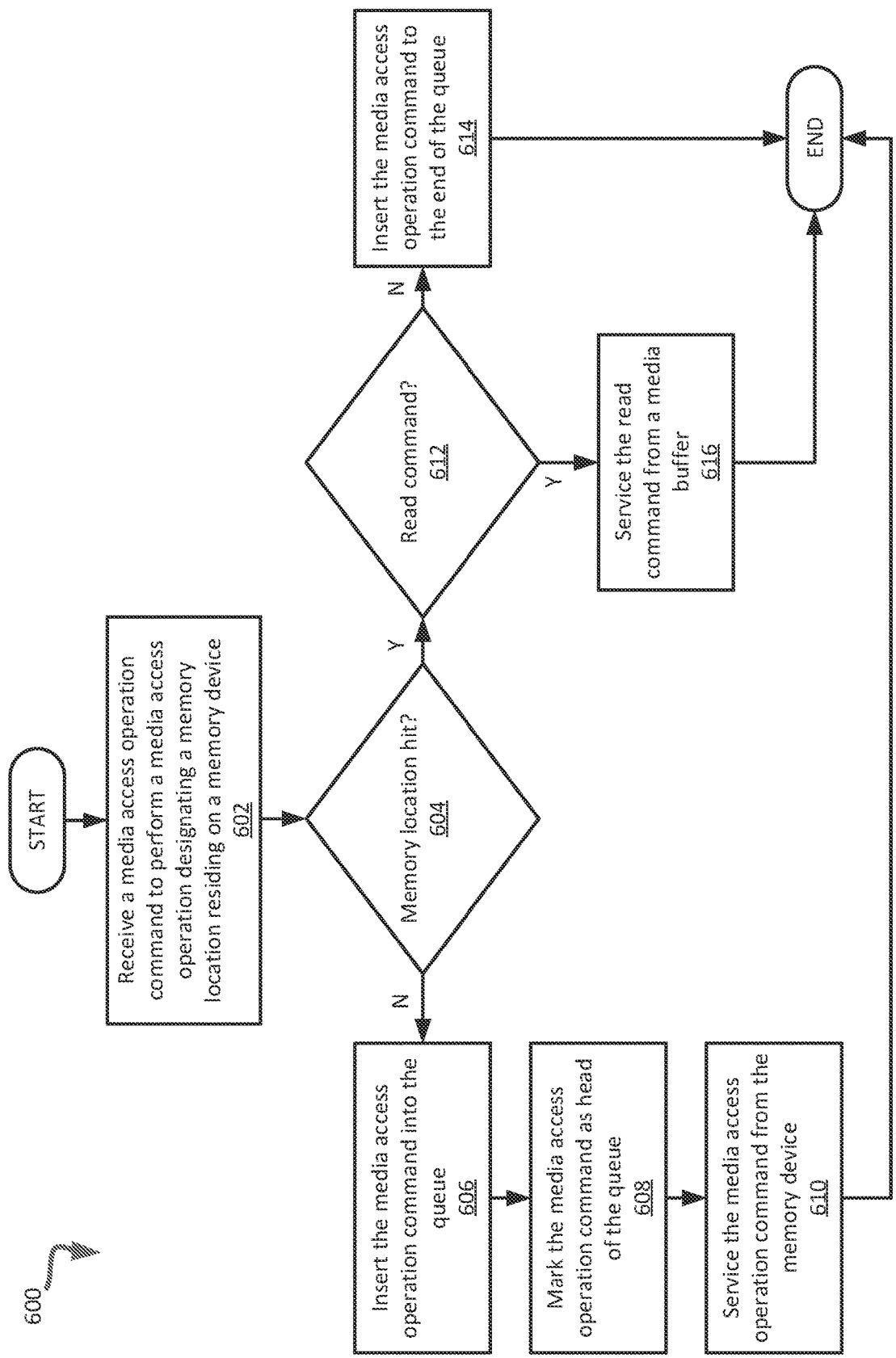
FIG. 6 is a flow diagram of an example method to perform an insertion operation for implementing media access operation command management, in accordance with some embodiments of the present disclosure.

FIG. 6 is a flow diagram of an example method 600 to perform an insertion operation for implementing media access operation command management, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the MOCM 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 602, the processing logic receives a media access operation command to perform a media access operation designating a memory location residing on a memory device. In some embodiments, the memory location is a physical block address (PBA). For example, the PBA can be associated with a 3DXP memory device. The media access operation command can further designate a type of the media access operation to be performed. Examples of types of media access operations include a write operation and a read operation.

At operation 604, the processing logic determines whether there is memory location hit. The memory location hit can be determined by performing a search operation with respect to a queue corresponding to the memory location. For example, the queue can be a linked list. The queue can be maintained in a CAM. Further details regarding operation 604 are described above with reference to FIG. 5.

A negative response means that there is a memory location miss. In response to this scenario, at operation 606, the processing logic inserts the media access operation command into the queue. The type of media access operation command is thus not relevant if there is a memory location miss, as any type of media access operation command is handled in the same way. The processing logic can then, at operation 608, mark the inserted media access operation command as head of the queue and, at operation 610, service the media access operation command from the memory device.

Otherwise, if there is a memory location hit, at operation 612, the processing logic determines whether the media access operation command is a read command. If not (e.g., the media access operation command is a write command), then the processing logic at operation 614 inserts the media access operation command to the end of the queue. The media access operation command can be blocked until the media access operation command can be forwarded for execution (e.g., when the media access operation command becomes the head of the queue). However, if the media access operation is a read command, the processing logic at operation 616 services the read command from a media buffer. The media buffer holds data from a previously completed write operation designating the memory location, and can thus serve the read command in a way that reduces the negative delay period impact.

Figure 7:
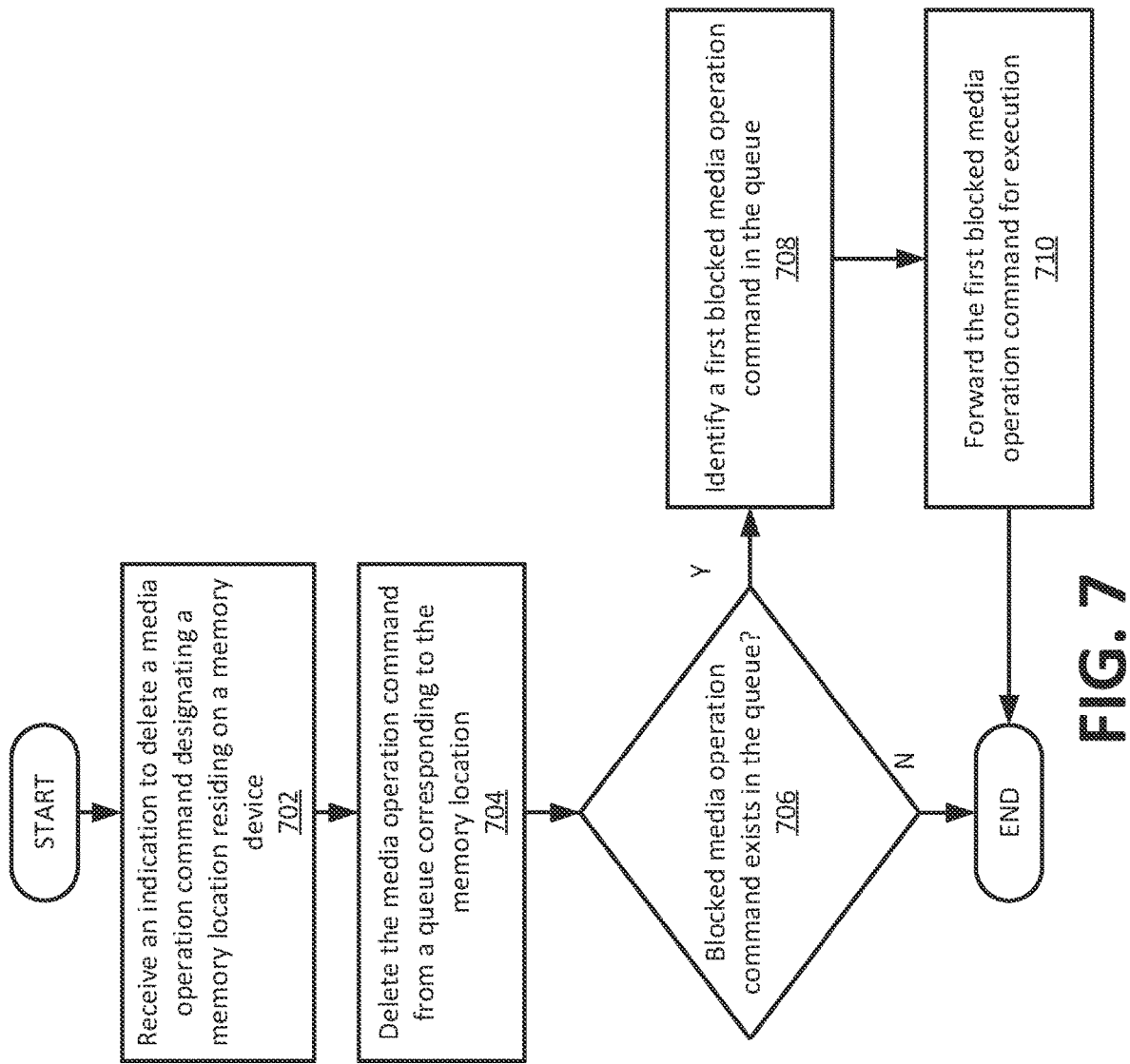
FIG. 7 is a flow diagram of an example method to perform a deletion operation for implementing media access operation command management, in accordance with some embodiments of the present disclosure.

FIG. 7 is a flow diagram of an example method 700 to perform a deletion operation for implementing media access operation command management, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the MOCM 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 702, the processing logic receives an indication to delete a media access operation command designating a memory location residing on a memory device. In some embodiments, the memory location is a physical block address (PBA). For example, the PBA can be associated with a 3DXP memory device. The media access operation command can further designate a type of the media access operation to be performed. Examples of types of media access operations include a write operation and a read operation.

At operation 704, the processing logic deletes the media access operation command from a queue corresponding to the memory location. For example, the media access operation command can be deleted from a head of the queue. The queue can be provided by a linked list identifying a set of media access operation commands. If the media access operation command is a write command, then the write command can be deleted after a delay period.

At operation 706, it is determined whether a blocked media access operation command exists in the queue. For example, the blocked media access operation command can refer to a media access operation command that preceded the media access operation command that was deleted from the queue.

If a blocked media access operation command exists in the queue, then the processing logic at operation 708 identifies a first blocked media access operation command in the queue (e.g., a new head of the queue), and forwards the first blocked media command for execution. That is, the processing logic "unblocks" the first blocked media command. Otherwise, if there are no blocked media access operation commands in the queue, this means that the queue is empty and no blocked media access operation commands can be forwarded from the queue. Therefore, the process ends.

Figure 8:
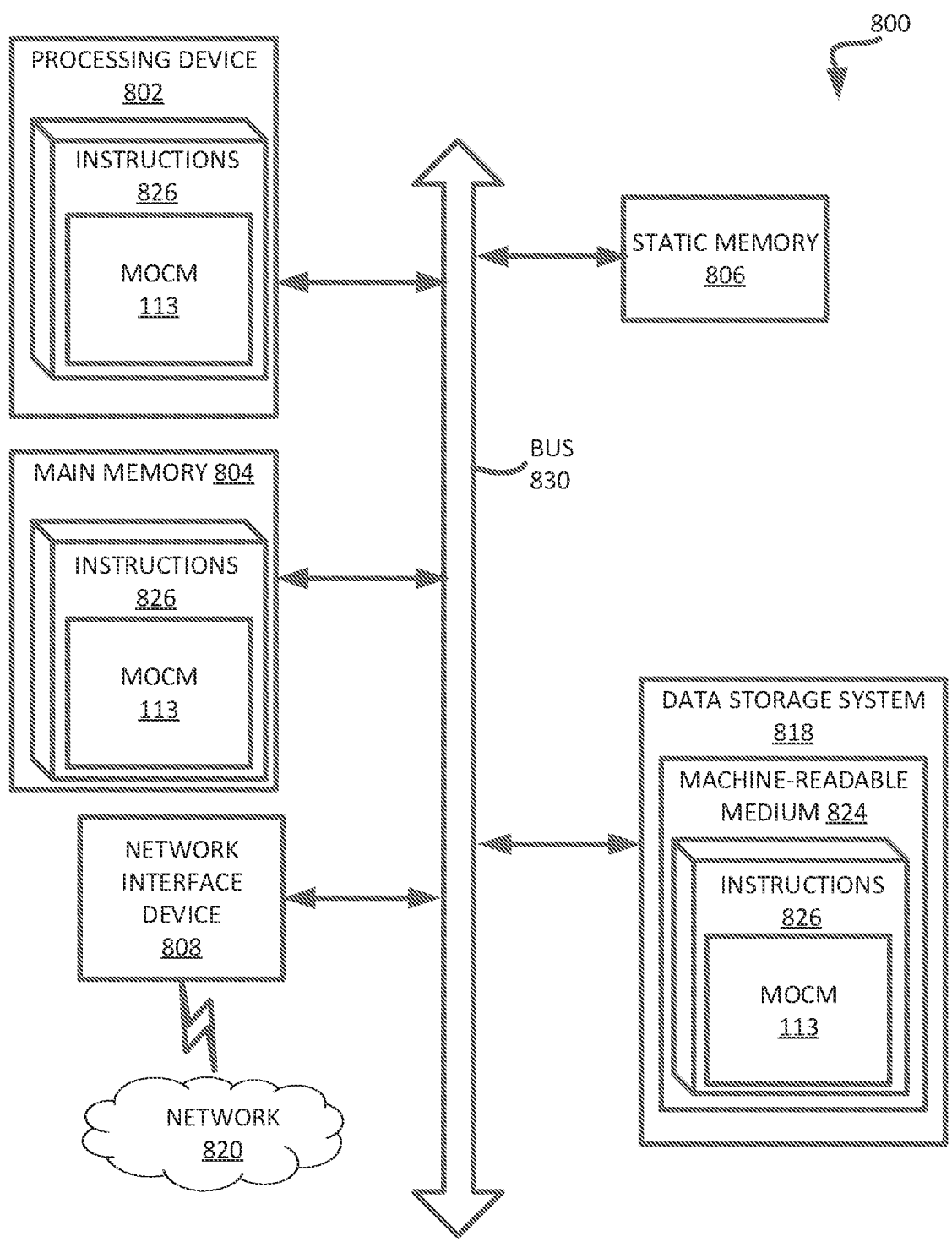
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the MOCM 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a MOCM (e.g., the MOCM 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled with the memory device, to perform operations comprising:
      receiving a media access operation command to perform a media access operation with respect to a memory location residing on the memory device, wherein the memory location is associated with a queue;
      determining whether there exists another memory location access at the memory location;
      in response to determining that another memory location access does not exist at the memory location, inserting the media access operation command into a head of the queue;
      servicing the media access operation command identified by the head of the queue;
      receiving an indication that the media access operation is complete;
      in response to receiving the indication, deleting the media access operation command from the queue;
      identifying a blocked media access operation command in the queue; and
      forwarding the blocked media access operation command for execution.

2. The system of claim 1, wherein the memory device comprises a three-dimensional cross-point memory device.

3. The system of claim 1, wherein the memory location comprises a physical block address (PBA).

4. The system of claim 1, wherein the queue is provided by a linked list identifying a set of media access operation commands.

5. The system of claim 1, wherein the queue is maintained in content-addressable memory.

6. The system of claim 1, wherein the operations further comprise:
   determining that the blocked media access operation command exists in the queue; and
   in response to determining that the blocked media access operation command exists in the queue, identifying the blocked media access operation command in the queue.

7. A method comprising:
   receiving, by a processing device, a media access operation command to perform a media access operation with respect to a memory location residing on a memory device, wherein the memory location is associated with a queue;
   determining, by the processing device, whether there exists another memory location access at the memory location;
   in response to determining that another memory location access exists at the memory location, inserting, by the processing device, the media access operation command into a head of a queue identifying a set of media access operation commands;
   servicing, by the processing device, the media access operation command identified by the head of the queue;
   receiving, by the processing device, an indication that the media access operation is complete;
   in response to receiving the indication, deleting, by the processing device, the media access operation command from the queue;
   identifying, by the processing device, a blocked media access operation command in the queue; and
   forwarding, by the processing device, the blocked media access operation command for execution.

8. The method of claim 7, wherein the memory device comprises a three-dimensional cross-point memory device, and wherein the memory location comprises a physical block address (PBA).

9. The method of claim 7, wherein the queue is provided by a linked list identifying a set of media access operation commands.

10. The method of claim 7, wherein the queue is maintained in content-addressable memory.

11. The method of claim 7, further comprising: determining, by the processing device, that the blocked media access operation command exists in the queue; and in response to determining that the blocked media access operation command exists in the queue, identifying, by the processing device, the blocked media access operation command in the queue.

12. A system comprising:
   a memory device;
   content-addressable memory maintaining a queue corresponding to a memory location residing on the memory device, wherein the queue is provided as a linked list identifying a set of media access operation commands;

a delay line to implement a delay period after a completed write operation is performed;

a media buffer to maintain data associated with the completed write operation; and a processing device, operatively coupled to the memory device, to perform operations comprising:

receiving a media access operation command to perform a media access operation with respect to a memory location residing on the memory device;

determining, in view of the queue, whether there exists another memory location access at the memory location;

in response to determining that another memory location access exists at the memory location, inserting the media access operation command into a head of the queue;

servicing the media access operation command from the media buffer identified by the head of the queue;

receiving an indication that the media access operation is complete;

in response to receiving the indication, deleting the media access operation command from the queue;

identifying a blocked media access operation command in the queue; and forwarding the blocked media access operation command for execution.

13. The system of claim 12, wherein the memory device comprises a three-dimensional cross-point memory device, and wherein the memory location comprises a physical block address (PBA).

14. The system of claim 12, wherein the operations further comprise: determining that the blocked media access operation command exists in the queue; and in response to determining that the blocked media access operation command exists in the queue, identifying the blocked media access operation command in the queue.

15. The system of claim 1, wherein the operations further comprise:

in response to determining that another memory location access exists at the memory location, determining whether the media access operation command is a read command; and in response to determining that the media access operation is a read command, servicing the media access operation command from a media buffer, wherein the media buffer maintains data associated with a completed write operation.

16. The system of claim 15, wherein the operations further comprise:

in response to determining that the media access operation command is not a read command, inserting the media access operation command at a tail of the queue.

17. The method of claim 7, further comprising:

in response to determining that another memory location access exists at the memory location, determining, by the processing device, whether the media access operation command is a read command; and in response to determining that the media access operation is a read command, servicing, by the processing device, the media access operation command from a media buffer, wherein the media buffer maintains data associated with a completed write operation.

18. The method of claim 17, further comprising:

in response to determining that the media access operation command is not a read command, inserting, by the processing device, the media access operation command at a tail of the queue.

19. The system of claim 12, wherein the operations further comprise:

in response to determining that another memory location access exists at the memory location, determining whether the media access operation command is a read command; and in response to determining that the media access operation is a read command, servicing the media access operation command from a media buffer, wherein the media buffer maintains data associated with a completed write operation.

20. The system of claim 19, wherein the operations further comprise:

in response to determining that the media access operation command is not a read command, inserting the media access operation command at a tail of the queue.

* * * * *